United States Patent [19]
Uchibori et al.

[11] Patent Number: 4,675,619
[45] Date of Patent: Jun. 23, 1987

[54] MULTIPLE QUADRATURE-PHASE AMPLITUDE MODULATING SYSTEM CAPABLE OF REDUCING A PEAK AMPLITUDE

[75] Inventors: Junichi Uchibori; Yutaka Koizumi; Toshihiko Ryu, all of Tokyo, Japan

[73] Assignee: NEC Corporation, Japan

[21] Appl. No.: 779,217

[22] Filed: Sep. 23, 1985

[30] Foreign Application Priority Data

Sep. 25, 1984 [JP] Japan ................................. 59-199980

[51] Int. Cl.⁴ ............................................ H04L 27/12
[52] U.S. Cl. .................................... 332/31 R; 332/48; 375/41
[58] Field of Search ...................... 332/16 R, 17, 23 R, 332/31 R, 48; 375/41; 455/108; 329/110, 122, 124

[56] References Cited

U.S. PATENT DOCUMENTS 4,077,021 2/1978 Csajka et al. .................... 332/9 R

FOREIGN PATENT DOCUMENTS 0154415 9/1985 European Pat. Off. .............. 375/41

OTHER PUBLICATIONS

Tanaka et al., "Correlative QAM", Electronics and Communications in Japan, vol. 61-B, No. 2, 1978.

Primary Examiner—Eugene R. Laroche
Assistant Examiner—Robert J. Pascal
Attorney, Agent, or Firm—Laff, Whitesel, Conte & Saret

[57] ABSTRACT

In a multiple QAM system in which a pair of quadrature-phase carrier signals is modulated by a first and a second input digital signal, each representative of N or less levels, into a quadrature-phase amplitude modulated signal having M signal points on a phase plane where M is equal to $N^2$, a code converting unit (41) converts the digital signals according to a predetermined rule into a first and a second modulating signal for use in modulating the carrier signals with the M signal points arranged approximately at a circle of a diameter which is shorter than a diagonal of a square of a side corresponding to the N levels. In a counterpart demodulating system, a pair of demodulated signals is derived from the amplitude modulated signal and converted into reproductions of the respective digital signals according to an inverse of the predetermined rule.

8 Claims, 12 Drawing Figures

| SIGNAL POINT | $S_{16}'$ | | | | | | $S_{17}'$ | | | | | SIGNAL POINT |
|---|---|---|---|---|---|---|---|---|---|---|---|---|
| | $P_0'$ | $P_1'$ | $P_2'$ | $P_3'$ | $P_4'$ | $P_5'$ | $P_1$ | $P_2$ | $P_3$ | $P_4$ | $E_P'$ | |
| $SP_1$ | 0 | 0 | 1 | 0 | 1 | X | 0 | 0 | 0 | 1 | C | $SP_1'$ |
| $SP_2$ | 0 | 0 | 1 | 1 | 0 | X | 0 | 0 | 0 | 1 | C | $SP_2'$ |
| $SP_3$ | 0 | 0 | 1 | 1 | 1 | X | 0 | 0 | 1 | 0 | C | $SP_3'$ |
| $SP_4$ | 1 | 0 | 0 | 0 | 0 | 0 | 0 | 0 | 0 | 0 | C | $SP_4'$ |
| $SP_5$ | 1 | 0 | 0 | 0 | 0 | 0 | 0 | 0 | 0 | 0 | C | $SP_5'$ |
| $SP_6$ | 1 | 0 | 0 | 0 | 0 | 0 | 0 | 0 | 0 | 0 | C | $SP_6'$ |
| $SP_7$ | 0 | 1 | 0 | 0 | 0 | X | 1 | 1 | 0 | 1 | C | $SP_7'$ |
| $SP_8$ | 0 | 1 | 0 | 0 | 1 | X | 1 | 1 | 1 | 0 | C | $SP_8'$ |
| $SP_9$ | 0 | 1 | 0 | 1 | 0 | X | 1 | 1 | 1 | 0 | C | $SP_9'$ |
| $SP_{10}$ | 1 | 1 | 0 | 0 | 0 | 0 | 1 | 1 | 1 | 1 | C | $SP_{10}'$ |
| $SP_{11}$ | 1 | 1 | 0 | 0 | 0 | 0 | 1 | 1 | 1 | 1 | C | $SP_{11}'$ |
| $SP_{12}$ | 1 | 1 | 0 | 0 | 0 | 0 | 1 | 1 | 1 | 1 | C | $SP_{12}'$ |
| $SP_{13}$ | 1 | 1 | 0 | 0 | 0 | 0 | 1 | 1 | 1 | 1 | C | $SP_{13}'$ |
| $SP_{14}$ | 1 | 1 | 0 | 0 | 0 | 0 | 1 | 1 | 1 | 1 | C | $SP_{14}'$ |
| $SP_{15}$ | 1 | 1 | 0 | 0 | 0 | 0 | 1 | 1 | 1 | 1 | C | $SP_{15}'$ |
| $SP_{16}$ | 0 | 1 | 0 | 1 | 0 | X | 1 | 1 | 1 | 0 | C | $SP_{16}'$ |
| $SP_{17}$ | 0 | 1 | 0 | 0 | 1 | X | 1 | 1 | 1 | 0 | C | $SP_{17}'$ |
| $SP_{18}$ | 0 | 1 | 0 | 0 | 0 | X | 1 | 1 | 0 | 1 | C | $SP_{18}'$ |
| $SP_{19}$ | 0 | 0 | 1 | 1 | 1 | X | 0 | 0 | 1 | 0 | C | $SP_{19}'$ |
| $SP_{20}$ | 0 | 0 | 1 | 1 | 0 | X | 0 | 0 | 0 | 1 | C | $SP_{20}'$ |
| $SP_{21}$ | 0 | 0 | 1 | 0 | 1 | X | 0 | 0 | 0 | 1 | C | $SP_{21}'$ |
| $SP_{22}$ | 1 | 0 | 0 | 0 | 0 | 0 | 0 | 0 | 0 | 0 | C | $SP_{22}'$ |
| $SP_{23}$ | 1 | 0 | 0 | 0 | 0 | 0 | 0 | 0 | 0 | 0 | C | $SP_{23}'$ |
| $SP_{24}$ | 1 | 0 | 0 | 0 | 0 | 0 | 0 | 0 | 0 | 0 | C | $SP_{24}'$ |

FIG.11

|  | $S_{26}'$ | | | | | | $S_{27}'$ | | | | | |
|---|---|---|---|---|---|---|---|---|---|---|---|---|
| SIGNAL POINT | $Q_0'$ | $Q_1'$ | $Q_2'$ | $Q_3'$ | $Q_4'$ | $Q_5'$ | $Q_1$ | $Q_2$ | $Q_3$ | $Q_4$ | $E_Q'$ | SIGNAL POINT |
| $SP_1$ | 1 | 1 | 0 | 0 | 0 | 0 | 1 | 1 | 1 | 0 | C | $SP_1'$ |
| $SP_2$ | 1 | 1 | 0 | 0 | 0 | 0 | 1 | 1 | 1 | 1 | C | $SP_2'$ |
| $SP_3$ | 1 | 1 | 0 | 0 | 0 | 0 | 1 | 1 | 1 | 1 | C | $SP_3'$ |
| $SP_4$ | 0 | 1 | 0 | 1 | 0 | X | 1 | 1 | 1 | 1 | C | $SP_4'$ |
| $SP_5$ | 0 | 1 | 0 | 0 | 1 | X | 1 | 1 | 1 | 0 | C | $SP_5'$ |
| $SP_6$ | 0 | 1 | 0 | 0 | 0 | X | 1 | 1 | 0 | 1 | C | $SP_6'$ |
| $SP_7$ | 1 | 1 | 0 | 0 | 0 | 0 | 1 | 1 | 1 | 1 | C | $SP_7'$ |
| $SP_8$ | 1 | 1 | 0 | 0 | 0 | 0 | 1 | 1 | 1 | 1 | C | $SP_8'$ |
| $SP_9$ | 1 | 1 | 0 | 0 | 0 | 0 | 1 | 1 | 1 | 0 | C | $SP_9'$ |
| $SP_{10}$ | 0 | 1 | 0 | 1 | 0 | X | 1 | 1 | 1 | 1 | C | $SP_{10}'$ |
| $SP_{11}$ | 0 | 1 | 0 | 0 | 1 | X | 1 | 1 | 1 | 0 | C | $SP_{11}'$ |
| $SP_{12}$ | 0 | 1 | 0 | 0 | 0 | X | 1 | 1 | 0 | 1 | C | $SP_{12}'$ |
| $SP_{13}$ | 0 | 0 | 1 | 1 | 1 | X | 0 | 0 | 1 | 0 | C | $SP_{13}'$ |
| $SP_{14}$ | 0 | 0 | 1 | 1 | 0 | X | 0 | 0 | 0 | 1 | C | $SP_{14}'$ |
| $SP_{15}$ | 0 | 0 | 1 | 0 | 1 | X | 0 | 0 | 0 | 0 | C | $SP_{15}'$ |
| $SP_{16}$ | 1 | 0 | 0 | 0 | 0 | 0 | 0 | 0 | 0 | 1 | C | $SP_{16}'$ |
| $SP_{17}$ | 1 | 0 | 0 | 0 | 0 | 0 | 0 | 0 | 0 | 0 | C | $SP_{17}'$ |
| $SP_{18}$ | 1 | 0 | 0 | 0 | 0 | 0 | 0 | 0 | 0 | 0 | C | $SP_{18}'$ |
| $SP_{19}$ | 1 | 0 | 0 | 0 | 0 | 0 | 0 | 0 | 0 | 0 | C | $SP_{19}'$ |
| $SP_{20}$ | 1 | 0 | 0 | 0 | 0 | 0 | 0 | 0 | 0 | 0 | C | $SP_{20}'$ |
| $SP_{21}$ | 1 | 0 | 0 | 0 | 0 | 0 | 0 | 0 | 0 | 1 | C | $SP_{21}'$ |
| $SP_{22}$ | 0 | 0 | 1 | 0 | 1 | X | 0 | 0 | 0 | 0 | C | $SP_{22}'$ |
| $SP_{23}$ | 0 | 0 | 1 | 1 | 0 | X | 0 | 0 | 0 | 1 | C | $SP_{23}'$ |
| $SP_{24}$ | 0 | 0 | 1 | 1 | 1 | X | 0 | 0 | 1 | 0 | C | $SP_{24}'$ |

FIG.12

MULTIPLE QUADRATURE-PHASE AMPLITUDE MODULATING SYSTEM CAPABLE OF REDUCING A PEAK AMPLITUDE

BACKGROUND OF THE INVENTION

This invention relates to a quadrature-phase amplitude modulating (often abbreviated to QAM) system and a quadrature-phase amplitude demodulating system for use as a counterpart of the modulating system.

In the QAM system, a pair of quadrature-phase carrier signals are amplitude modulated by a first and a second digital input signal into a quadrature-phase amplitude modulated signal of a certain transmission power. When each of the first and the second digital input signals is an i-bit binary signal, the digital input signal is capable of representing at most N levels where N is equal to $2^i$. The quadrature-phase amplitude modulated signal becomes an M-ary or multiple quadrature-phase amplitude modulated signal, namely, has M signal points on a phase plane which has an origin and real and imaginary axes crossing at the origin. The M signal points are arranged uniformly in a square having a center at the origin and sides parallel to the real and the imaginary axes. In other words, the M signal points are arranged in a lattice structure on the phase plane. Such a QAM system is herein called a multiple QAM system.

When transmitted from the QAM system to a quadrature-phase amplitude demodulating system through a transmission medium, the quadrature-phase amplitude modulated signal is inevitably subjected to a symbol error of a certain symbol error rate. The symbol error rate depends on a separation between two adjacent signal points. On the other hand, the transmission power is dependent on a peak amplitude of the quadrature-phase amplitude modulated signal, namely, a distance between the origin and a signal point placed at each vertex of the square. The peak amplitude increases in proportion to an increase of the signal points. It is desirable to reduce the transmission power. The separation, however, decreases and results in an increase of the symbol error rate if the peak amplitude is reduced in order to reduce the transmission power.

A hexagonal signal arrangement is exemplified in an article contributed by Marvin K. Simon and Joel G. Smith to IEEE Transactions on Communications, Vol. COM-21, No. 10 (October 1973), pages 1108 to 1115, under the title of "Hexagonal Multiple Phase-and-Amplitude-Shift-Keyed Signal Sets." The hexagonal signal arrangement is capable of reducing the peak amplitude as small as possible. The hexagonal signal arrangement is, however, hard to realize a circuit for arranging the signal points on the phase plane.

SUMMARY OF THE INVENTION

It is therefore an object of this invention to provide a multiple quadrature-phase amplitude modulating system capable of producing a multiple quadrature-phase amplitude modulated signal which has a least possible peak amplitude and can be transmitted through a transmission medium with a least possible symbol error.

It is another object of this invention to provide a multiple quadrature-phase amplitude demodulating system for use as a counterpart of the modulating system of the type described above.

A multiple quadrature-phase amplitude modulating system to which this invention is applicable modulates a pair of quadrature-phase carrier signals by first and second input digital signals into a multiple quadrature-phase amplitude modulated signal. Each of the first and the second input digital signals is capable of representing at most N levels where N is equal to $2^i$ where, in turn, i represents an integer which is not less than four. The multiple quadrature-phase amplitude modulated signal has M signal points on a phase plane where M is equal to $N^2$. The multiple quadrature-phase amplitude modulating system comprises modulating means for amplitude modulating the quadrature-phase carrier signals into the multiple quadrature-phase amplitude modulated signal by first and second modulating signals. According to this invention, the multiple quadrature-phase amplitude modulating system further comprises converting means for converting the first and the second input digital signals to the first and the second modulating signals according to a predetermined rule. The predetermined rule is for arranging the M signal points nearly at a circle on the phase plane.

BRIEF DESCRIPTION OF THE DRAWING

FIG. 11 is a view for use in describing an operation of a converting circuit included in the system illustrated in FIG. 8; and FIG. 12 is a view for use in describing another operation of the converting circuit illustrated in FIG. 8.

DESCRIPTION OF THE PREFERRED EMBODIMENTS

Referring to FIGS. 1, 2, 3, and 4, description will be made as regards a conventional multiple QAM system and a conventional multiple quadrature-phase amplitude demodulating system in order to facilitate an understanding of this invention.

Figure 1:
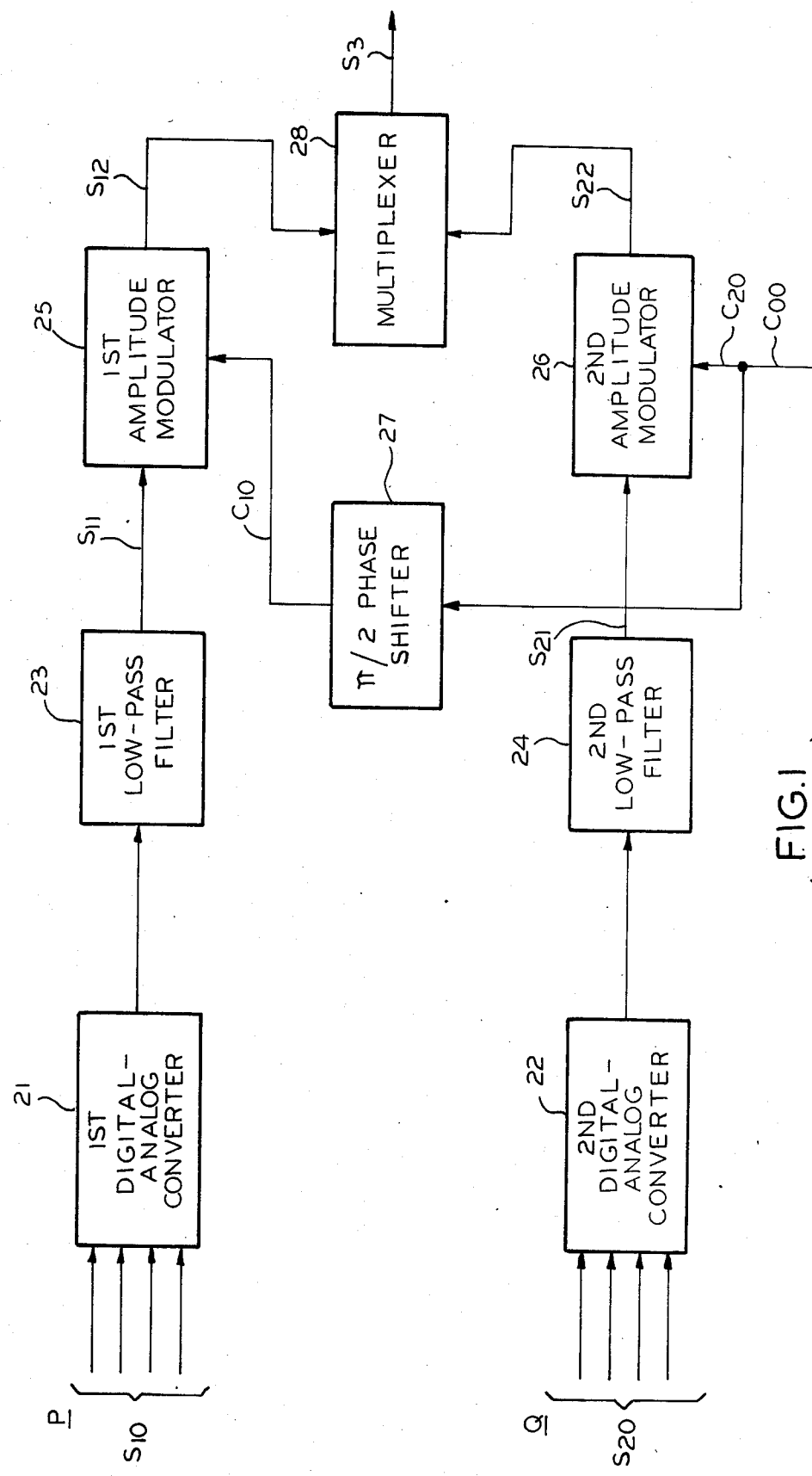
FIG. 1 is a block digram of a conventional multiple quadrature-phase amplitude modulating system.

In FIG. 1, the conventional multiple quadrature-phase amplitude modulating system is for use in a sixteen-by-sixteen quadrature-phase amplitude modulating system, namely, 256-QAM system. It is readily understood under the circumstances that i and N are equal to four and sixteen, respectively. The modulating system comprises a first digital-analog converter 21 supplied with a first input digital signal $S_{10}$ of a channel P and a second digital-analog converter 22 supplied with a second input digital signal $S_{20}$ of another channel Q. Each of the first and the second input digital signals $S_{10}$ and $S_{20}$ is a four-bit binary digital signal and capable of representing sixteen levels. The first and the second digital-analog converters 21 and 22 are for converting the first and the second input digital signals $S_{10}$ and $S_{20}$ to first and second analog signals, respectively, each of which has an amplitude determined by each input digital signal $S_{10}$ and $S_{20}$. The first and the second analog signals are delivered through first and second low-pass filters 23 and 24 to first and second amplitude modulators 25 and 26 as first and second modulating signals $S_{11}$ and $S_{21}$, respectively. The first and the second amplitude modulators 25 and 26 are also supplied with a first carrier signal $C_{10}$ and a second carrier signal $C_{20}$ having a quadrature phase difference relative to the first carrier signal $C_{10}$. The first and the second amplitude modulators 25 and 26 amplitude modulate the first and the second carrier signals $C_{10}$ and $C_{20}$ by the first and the second modulating signals $S_{11}$ and $S_{21}$, respectively.

In order to produce the first and the second carrier signals $C_{10}$ and $C_{20}$, the QAM system comprises an oscillator (not shown) for producing a carrier oscillation signal $C_{00}$. The carrier oscillation signal $C_{00}$ is divided into two parts one of which is given through a $\pi/2$-phase shifter 27 to the first amplitude modulator 25 as the first carrier signal $C_{10}$ and the other of which is given to the second modulator 26 as the second carrier signal $C_{20}$.

The first and the second amplitude modulators 25 and 26 produce first and second modulated signals $S_{12}$ and $S_{22}$ and deliver the first and the second modulated signals $S_{12}$ and $S_{22}$ to a multiplexer 28. The multiplexer 28 is for multiplexing the first and the second modulated signals $S_{12}$ and $S_{22}$ into a multiple quadrature-phase amplitude modulated signal $S_3$. The signal $S_3$ has two hundred fifty-six signal points on a phase plane as will later be described. The signal $S_3$ is amplified by a transmission power amplifier (not shown) and transmitted to the multiple quadrature-phase amplitude demodulating system through a transmission medium.

Figure 2:
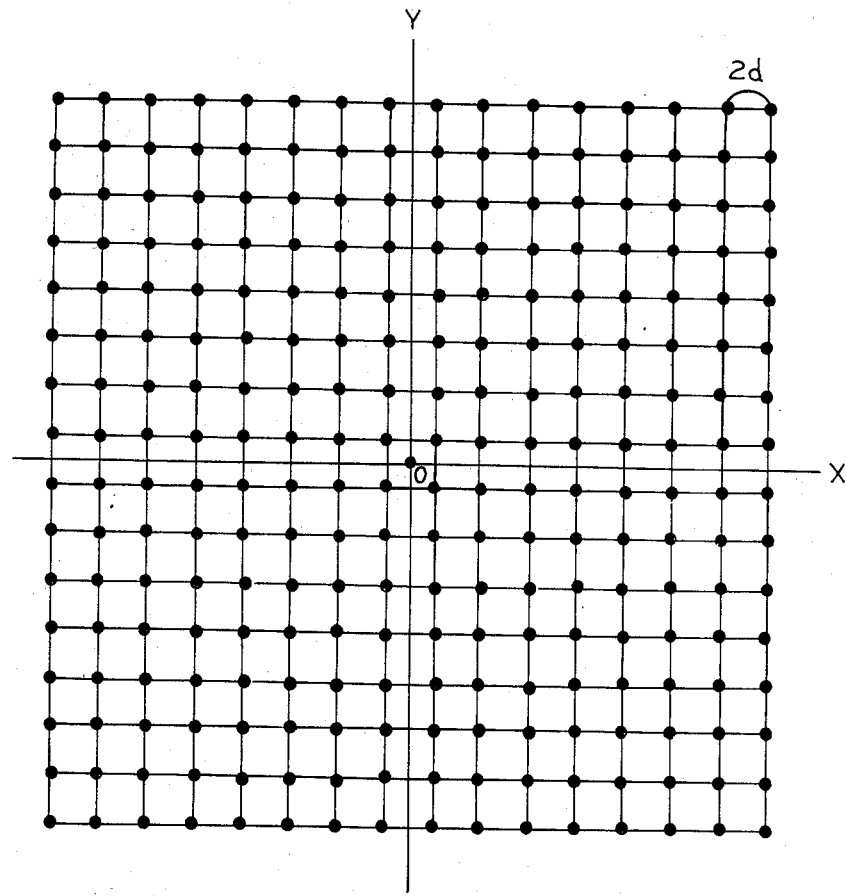
FIG. 2 is a view for use in describing a signal point arrangement of the multiple quadrature-phase amplitude modulating system illustrated in FIG. 1.

Referring to FIG. 2, the two hundred fifty-six signal points (shown by dots) are arranged in a lattice structure on the phase plane defined by an origin O and orthogonal coordinate axes which are usually referred to as real and imaginary axes X and Y crossing at the origin O. The real and the imaginary axes X and Y represent the first and the second modulated signals $S_{12}$ and $S_{22}$ for the respective channels P and Q (FIG. 1). Each of the first and the second modulated signals $S_{12}$ and $S_{22}$ has sixteen amplitudes.

Figure 3:
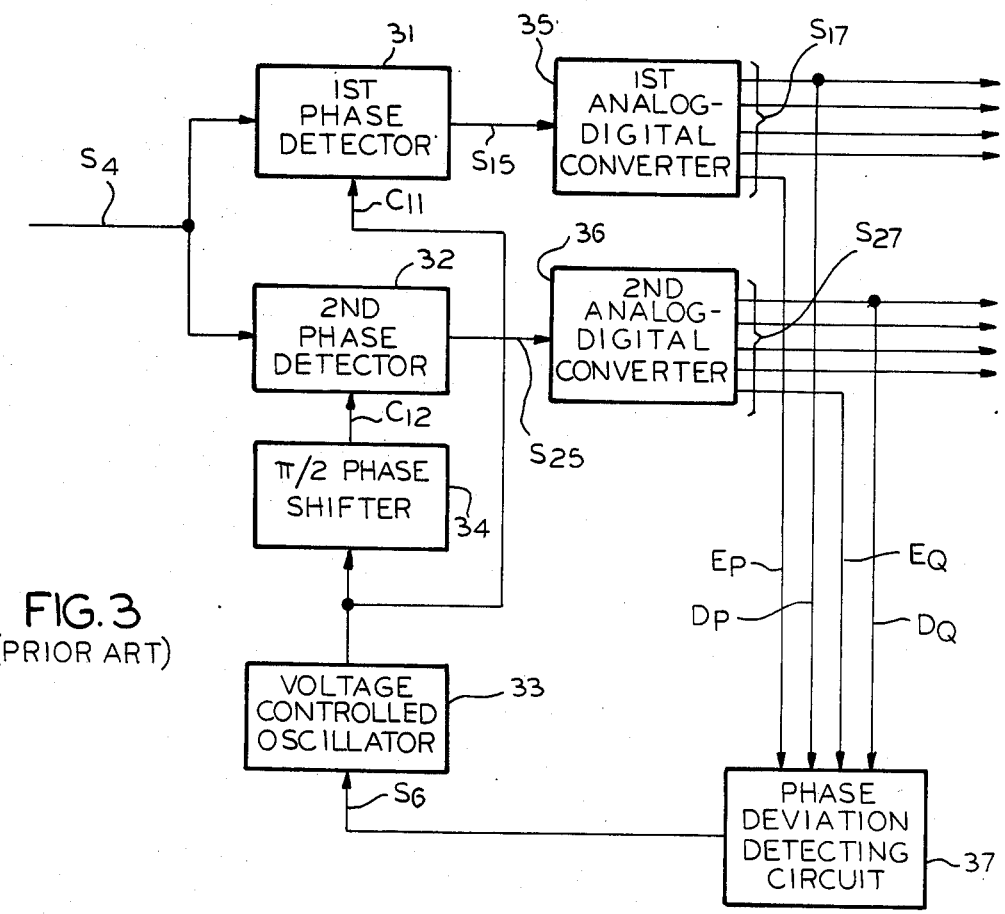
FIG. 3 is a block diagram of a conventional multiple quadrature-phase amplitude demodulating system for use as a counterpart of the multiple quadrature-phase amplitude modulating system illustrated in FIG. 1.

Referring to FIG. 3, a conventional multiple quadrature-phase amplitude demodulating system is for use as a counterpart of the 256-QAM system described above. The demodulating system comprises first and second phase detectors 31 and 32 supplied with the multiple quadrature-phase amplitude modulated signal as a demodulator input signal $S_4$. The first and the second phase detectors 31 and 32 carry out phase detection of the demodulator input signal $S_4$ with reference to first and second local carrier signals $C_{11}$ and $C_{12}$ which may generally be called reproduced carrier signals. The second local carrier signal $C_{11}$ has a quadrature phase difference relative to the first local carrier signal $C_{11}$. As a result of the phase detection, the first phase detector 31 produces a first analog signal as a first demodulated signal $S_{15}$ for the channel P. Similarly, the second phase detector 32 produces a second analog signal as a second demodulated signal $S_{25}$ for the channel Q. Each of the first and the second demodulated signals $S_{15}$ and $S_{25}$ has an amplitude dependent on each input digital signal $S_{10}$ and $S_{20}$ (FIG. 1).

In order to produce the first and the second local carrier signals $C_{11}$ and $C_{12}$, the demodulating system comprises a voltage controlled oscillator 33 responsive to a phase control signal $S_6$ (to be later detailed) for producing a local oscillation signal. The local oscillation signal is divided into two parts one of which is given to the first phase detector 31 as the first local carrier signal $C_{11}$ and the other of which is given through a $\pi/2$-phase shifter 34 to the second phase detector 32 as the second local carrier signal $C_{12}$.

The first and the second demodulated signals $S_{15}$ and $S_{25}$ are supplied to first and second analog-digital converters 35 and 36, respectively. The first and the second analog-digital converters 35 and 36 are for converting the first and the second demodulated signals $S_{15}$ and $S_{25}$ into first and second output digital signals $S_{17}$ and $S_{27}$, respectively, each of which has five bits numbered from a first bit to a fifth bit. The first through the fourth bits of the first output digital signal $S_{17}$ are produced as a reproduction of the first input digital signal $S_{10}$ (FIG. 1). The fifth bit of the first output digital signal $S_{17}$ is produced as a first phase deviation signal $E_P$ of the channel P. Likewise, the first through the fourth bits of the second output digital signal $S_{27}$ are produced as a reproduction of the second input digital signal $S_{20}$ (FIG. 1). The fifth bit of the second output digital signal $S_{27}$ is produced as a second phase deviation signal $E_Q$ of the channel Q.

Both of the first bits of the first and the second output digital signals $S_{17}$ and $S_{27}$ serve to distinguish the first through the fourth quadrants of the phase plane as illustrated in FIG. 2 and are delivered to a phase deviation detecting circuit 37 as first and second data signals $D_P$ and $D_Q$, respectively. For example, a logic "1" level of the first data signal $D_P$ specifies the first and the second quadrants of the phase plane while a logic "0" level thereof specifies the third and the fourth quadrants. Likewise, the logic "1" and the logic "0" levels of the second data signal $D_Q$ specify the first and the fourth quadrants and the second and the third quadrants, respectively.

The first and the second phase deviation signals $E_P$ and $E_Q$ are also delivered to the phase deviation detecting circuit 37. The first and the second phase deviation signals $E_P$ and $E_Q$ are indicative of phase deviations between the first local carrier signal $C_{11}$ and a carrier signal included in the first demodulated signal $S_{15}$ and between the second local carrier signal $C_{12}$ and a carrier signal included in the second demodulated signal $S_{25}$, respectively. For example, each of the first and the second phase deviation signals $E_P$ and $E_Q$ may take the logic "1" level and the logic "0" level when the phase deviation is positive and negative, respectively.

Figure 4:
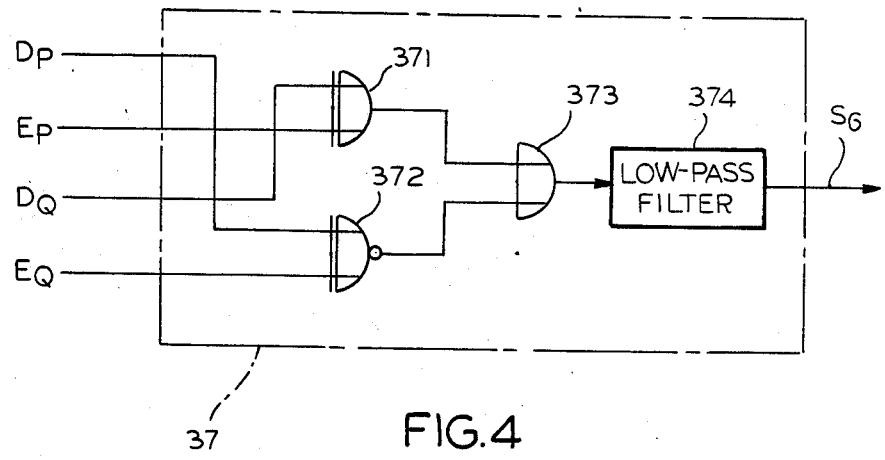
FIG. 4 is a block diagram of a phase deviation detecting circuit operable as a part of the multiple quadrature-phase amplitude demodulating system illustrated in FIG. 3.

Turning to FIG. 4, the phase deviation detecting circuit 37 produces the phase control signal $S_6$ in response to the first and the second data signals $D_P$ and $D_Q$ and the first and the second phase deviation signals $E_P$ and $E_Q$. More particularly, the phase deviation detecting circuit 37 comprises Exclusive OR and NOR circuits 371 and 372, an OR circuit 373, and a low-pass filter 374. Responsive to the first phase deviation signal $E_P$ and the second data signal $D_Q$, the Exclusive OR circuit 371 produces a first gate output signal. Supplied with the second phase deviation signal $E_Q$ and the first data signal $D_P$, the Exclusive NOR circuit 372 produces a second gate output signal. The OR circuit 373 is supplied with the first gate output signal and the second gate output signal. The phase deviation detecting circuit 37 produces the phase control signal $S_6$ given by:

$$S_6 = E_P D_Q + \overline{E_Q D_P}.$$

Turning back to FIG. 3, the phase control signal $S_6$ is delivered to the voltage controlled oscillator 33. The local oscillation signal of the voltage controlled oscillator 33 is controlled and phase-locked in response to the phase control signal $S_6$. Thus, the illustrated demodulating system comprises a phase locked loop which is constructed by the first and the second phase detectors 31 and 32, the first and the second analog-digital converters 35 and 36, the phase deviation detecting circuit 37, the voltage controlled oscillator 33, and the $\pi/2$ phase shifter 34.

Referring back to FIG. 2, it is supposed that the above-mentioned separation between two adjacent signal points is equal to 2d. Under the circumstances, the peak amplitude of the two hundred fifty-six quadrature-phase amplitude modulated signal is equal to a length of a diagonal between the origin and each vertex of the quadrants and given by $15\sqrt{2}d$ or about 21.2d. In the manner pointed out heretobefore, a peak transmission power which is required to transmit the multiple quadrature-phase amplitude modulated signal is in proportion to a square of the peak amplitude. Accordingly, it is necessary to reduce the peak amplitude in order to save the transmission power. In a square signal arrangement illustrated in FIG. 2, the separation becomes narrow as the peak amplitude decreases. Therefore, the conventional multiple QAM system has a disadvantage as described hereinabove.

On the other hand, the transmission power amplifier in the QAM system generally has a saturation characteristic. Accordingly, the multiple quadrature-phase amplitude modulated signal of a high peak amplitude is inevitably subjected to amplitude and phase distortion in the transmission power amplifier. Such a modulated signal is accompanied by a symbol error resulting from the saturation characteristic.

Figure 5:
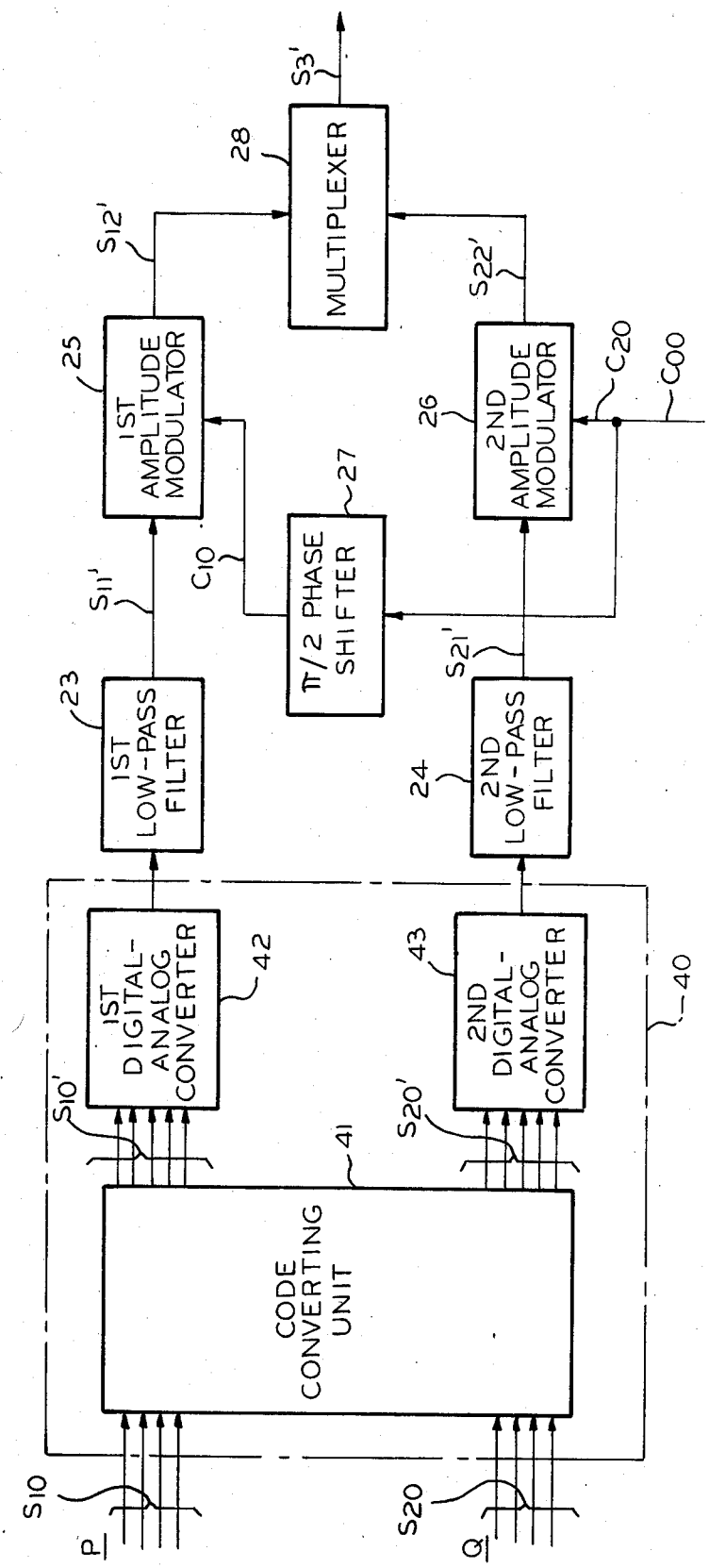
FIG. 5 is a block diagram of a multiple quadrature-phase amplitude modulating system according to a preferred embodiment of this invention.

Referring to FIG. 5, a 256-QAM system according to an embodiment of this invention is similar to that illustrated in FIG. 1 except for a converting circuit 40. The converting circuit 40 is for converting the first and the second input digital signals $S_{10}$ and $S_{20}$ to first and second analog signals in a manner to be described below. Like in FIG. 1, each of the first and the second input digital signals $S_{10}$ and $S_{20}$ has four bits and can therefore represent up to sixteen different levels. The converting circuit 40 comprises a code converting unit 41 and first and second digital-analog converters 42 and 43. The code converting unit 41 is for arranging two hundred fifty-six signal points (as illustrated in FIG. 2) into a nearly circular shape on the phase plane in accordance with a predetermined rule, as will later be described in detail. More specifically, the first and the second input digital signals $S_{10}$ and $S_{20}$ are converted by the code converting unit 41 to first and second modified digital signals $S_{10}'$ and $S_{20}'$. Each of the first and the second modified digital signals $S_{10}'$ and $S_{20}'$ has five bits and can represent thirty-two levels at maximum. In the example being illustrated, only eighteen levels can be specified by each modified digital signal in a manner to be described later. As a result, the first and the second modified digital signals $S_{10}'$ and $S_{20}'$ are converted to the first and the second analog signals each of which has an amplitude determined by eighteen levels of the first and the second modified digital signals $S_{10}'$ and $S_{20}'$.

The first and the second analog signals are delivered through the first and the second low-pass filters 23 and 24 to the first and the second amplitude modulators 25 and 26 as first and second modulating signals $S_{11}'$ and $S_{21}'$, respectively. The first and the second amplitude modulators 25 and 26 amplitude modulate the first and the second carrier signals $C_{10}$ and $C_{20}$. The first and the second carrier signals $C_{10}$ and $C_{20}$ are generated like in the conventional modulating system shown in FIG. 1. The first and the second amplitude modulators 25 and 26 produce first and second modulated signals $S_{12}'$ and $S_{22}'$. The multiplexer 28 multiplexes the first and the second modulated signals $S_{12}'$ and $S_{22}'$ into a multiple quadrature-phase amplitude demodulated signal $S_3'$. The signal $S_3'$ has an amplitude related to two hundred fifty-six signal points arranged on the phase plane.

Figure 6:
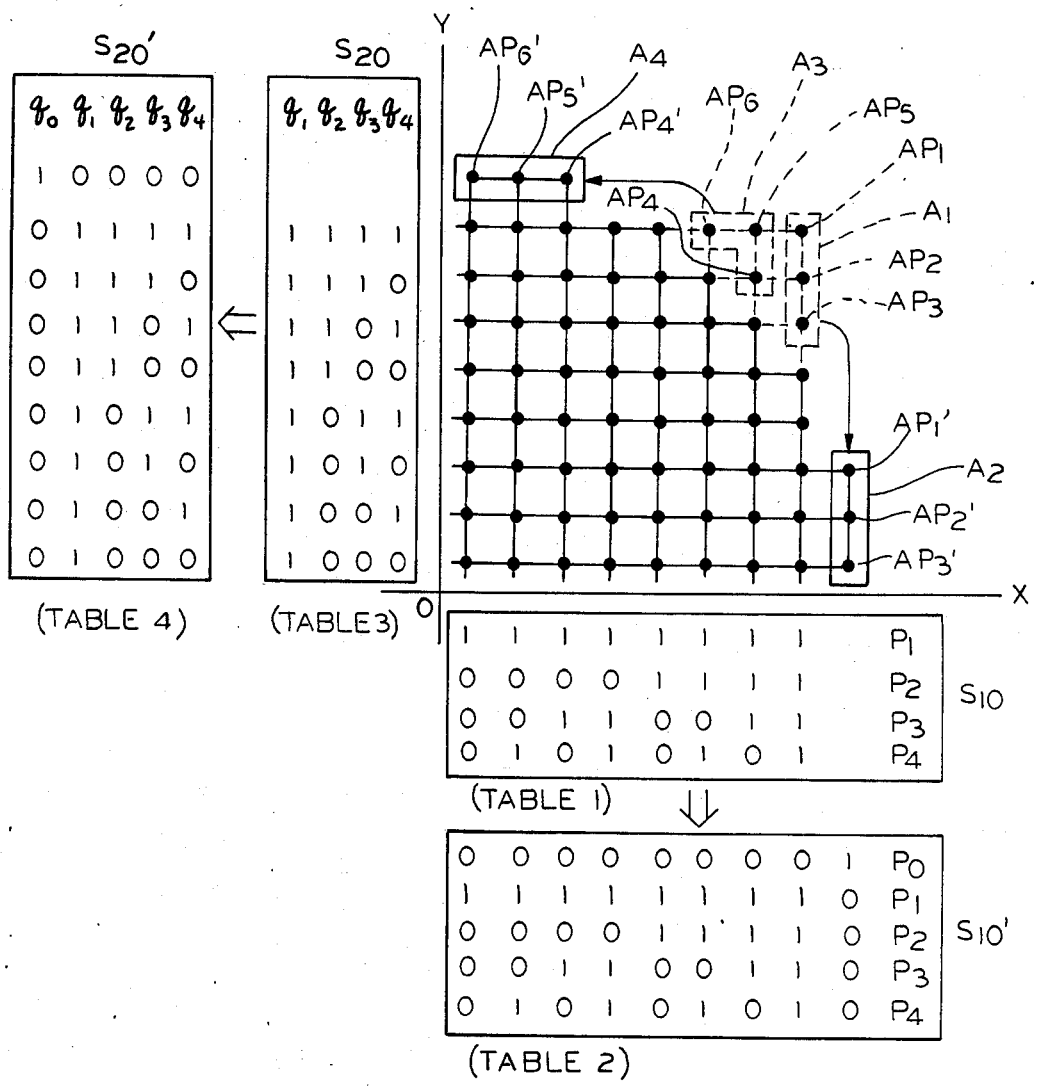
FIG. 6 is a view for use in describing a predetermined rule for arranging the signal points nearly at a circle according to the multiple quadrature-phase amplitude modulating system illustrated in FIG. 5.

Referring to FIG. 6, description will be made as regards the predetermined rule used in the code converting unit 41. Although restricted to the first quadrant of the phase plane, the description applies to the remaining quadrants.

In FIG. 6, sixty-four signal points for the first and the second input digital signals S10 and S20 are mapped on the first quadrant in the form of a square of eight-by-eight, like in FIG. 2. In other words, the outermost signal points, fifteen in number, of the signal points are arranged along two sides of the square before the first and the second input digital signals $S_{10}$ and $S_{20}$ are subjected to code conversion carried out in accordance with the predetermined rule. The outermost signal points has a vertex signal point depicted at $AP_1$ and is placed at a corner of the square opposite to the origin O. A distance between the origin O and the vertex signal point $AP_1$ is equal to a length of a diagonal of the square and can be represented by $15\sqrt{2}d$, as described in conjunction with FIG. 2.

Briefly, the predetermined rule is for shifting the vertex signal point $AP_1$ and the adjacent one or ones of the signal points along the real axis X and/or the imaginary axis Y so as to reduce the peak amplitude described in conjunction with FIG. 2. The resultant signal points are arranged nearly at a circle on the phase plane. The shifted signal points must be located within a circle having a radius equal to the diagonal. Otherwise, the peak amplitude can not be reduced.

As readily understood by considering the second through fourth quadrants similar to the first quadrant illustrated in FIG. 6, a relationship between the number N and a radius r of the circle in the circular arrangement is given by:

$$\pi r^2 = N^2.$$

Therefore, the radius r may be greater than:

$$r = N/\sqrt{\pi}.$$

In order to arrange the resultant signal points within the circle, the number of levels must be calculated with respect to the real and the imaginary axes X and Y and is equal to (N +2n), where n is representative of a greatest integer that is not greater than $(N/\sqrt{\pi} - N/2)$.

In the example being illustrated, the vertex signal point $AP_1$ and two of the outermost signal points $AP_2$ and $AP_3$ vertically adjacent to the vertex signal point $AP_1$ are shifted towards the real axis X and rearranged into resultant signal points $AP_1'$, $AP_2'$, and $AP_3'$, respectively. An area for the signal points $AP_1$, $AP_2$, and $AP_3$ may be called a first area $A_1$ while another area for the resultant signal points $AP_1'$, $AaP_2'$, and $AP_3'$ may be called a second area $A_2$. As shown in FIG. 6, the resultant signal points $AP_1'$, $AP_2'$, and $AP_3'$ are positioned at ninth signal points along the real axis.

In addition, three additional ones $AP_4$, $AP_5$, and $AP_6$ of the signal points are located in a third area $A_3$ and shifted towards a fourth area $A_4$ adjacent to the imaginary axis Y. The three additional signal points $AP_4$ to $AP_6$ are diagonally adjacent to the vertex signal point $AP_1$ and horizontally adjacent to the vertex signal point $AP_1$. They are rearranged into resultant additional points $AP_4'$ to $AP_6'$ which are placed in the fourth area $A_4$ and which are positioned at ninth signal points along the imaginary axis Y.

In addition to the first quadrant, Tables 1 through 4 are illustrated along the real and the imaginary axes X and Y to describe the predetermined rule in detail. Table 1 shows a relationship between the eight signal points arranged along the real axis X and four-bit codes assigned to the first digital input signal $S_{10}$ at the respective signal points. The four-bit codes of the first digital input signal $S_{10}$ are converted by the code converting unit 41 into five-bit codes $p_0$ to $p_4$ as illustrated in Table 2. As shown in Table 2, zeroth bits $p_0$ of the five-bit codes $p_0$ to $p_4$ take the logic "1" level only when ninth signal points $AP_1'$ to $AP_3'$ are specified. Otherwise, the zeroth bits $p_0$ take the logic "0" level. Thus, the four-bit codes of the first input digital signal $S_{10}$ are modified into the five-bit codes of the first modified digital signal $S_{10}'$ in the manner illustrated in Table 2.

Likewise, the four-bit codes of the second input digital signal $S_{20}$ which are illustrated in Table 3 are modified into five-bit codes as illustrated in Table 4. The five-bit codes are produced as the second modified digital signal $S_{20}'$ and have zeroth bits $q_0$ attached to the four-bit codes. The zeroth bits $q_0$ take the logic "1" level only when the ninth signal points $AP_4'$ to $AP_6'$ are specified.

The above-mentioned code conversion is possible by monitoring a combination of the first and the second input digital signals $S_{10}$ and $S_{20}$ y the code converting unit 41. For example, the vertex signal point $AP_1$ is shifted to the resultant signal point $AP_1'$ and represented from Tables 2 and 4 by a combination of "10000" and "01010". Likewise, the signals $AP_2$ and $AP_3$ are shifted to the resultant signal points $AP_2'$ and $AP_3'$ which are represented by "10000" and "01001" and by "10000" and "01000," respectively.

The above-mentioned code conversion is readily possible by the use of a usual logic circuit and a microprocessor. Therefore, no description will be made about the code converting unit 41 any longer.

Figure 7:
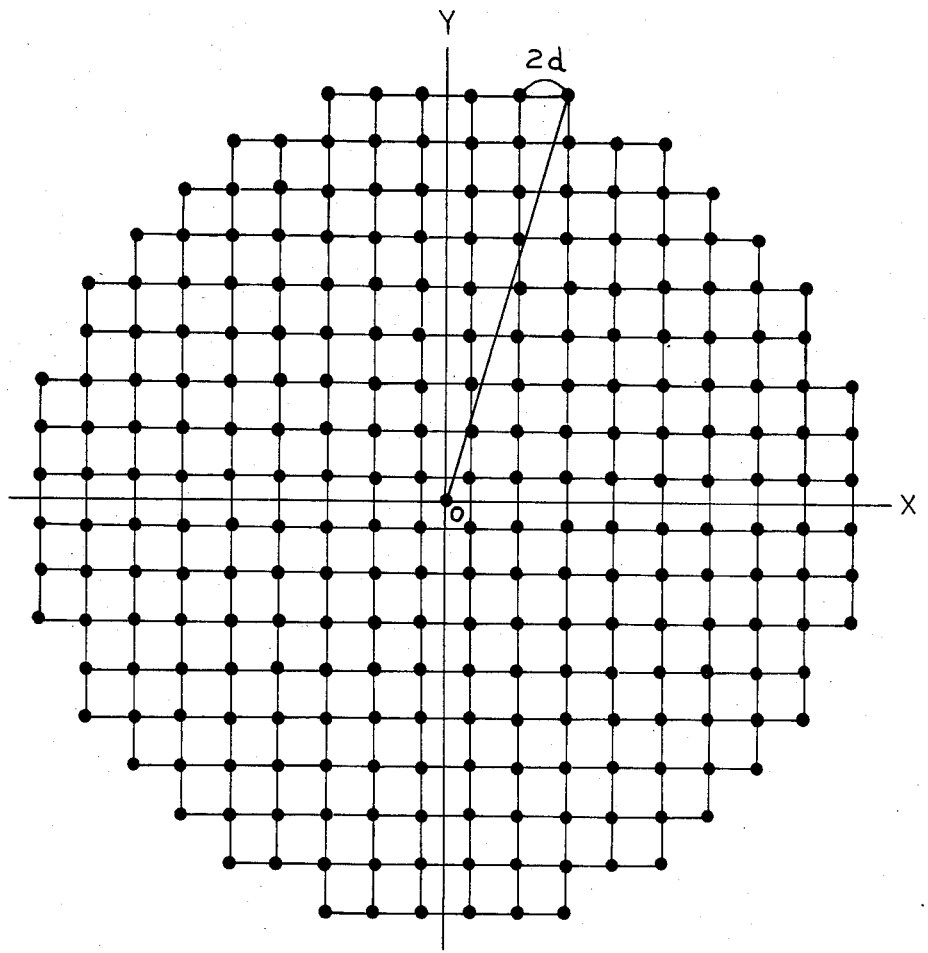
FIG. 7 is a view for use in describing a signal point arrangement according to the multiple quadrature-phase amplitude modulating system illustrated in FIG. 5.

Referring to FIG. 7, it will be supposed that the separation between two adjacent signal points is given by 2d along the real and the imaginary axes X and Y. A maximum or peak amplitude of the above-described signal point arrangement is given by $\sqrt{5^2 + 17^2}\cdot d$, namely, by $\sqrt{314}\cdot d$. The transmission power in the multiple QAM system is in proportion to a square of the peak amplitude as described hereinbefore. Accordingly, the transmission power according to the embodiment of this invention is reduced to $(\sqrt{314\cdot d}/15\sqrt{2}\cdot d)^2$, namely, to about 0.7 in comparison with the conventional 256-QAM system shown in FIG. 1.

Furthermore, the multiple quadrature-phase amplitude modulated signal $S_3'$ according to this invention has a least possible peak amplitude, so that the amplitude and phase distortion does not arise in the transmission power amplifier.

Figure 8:
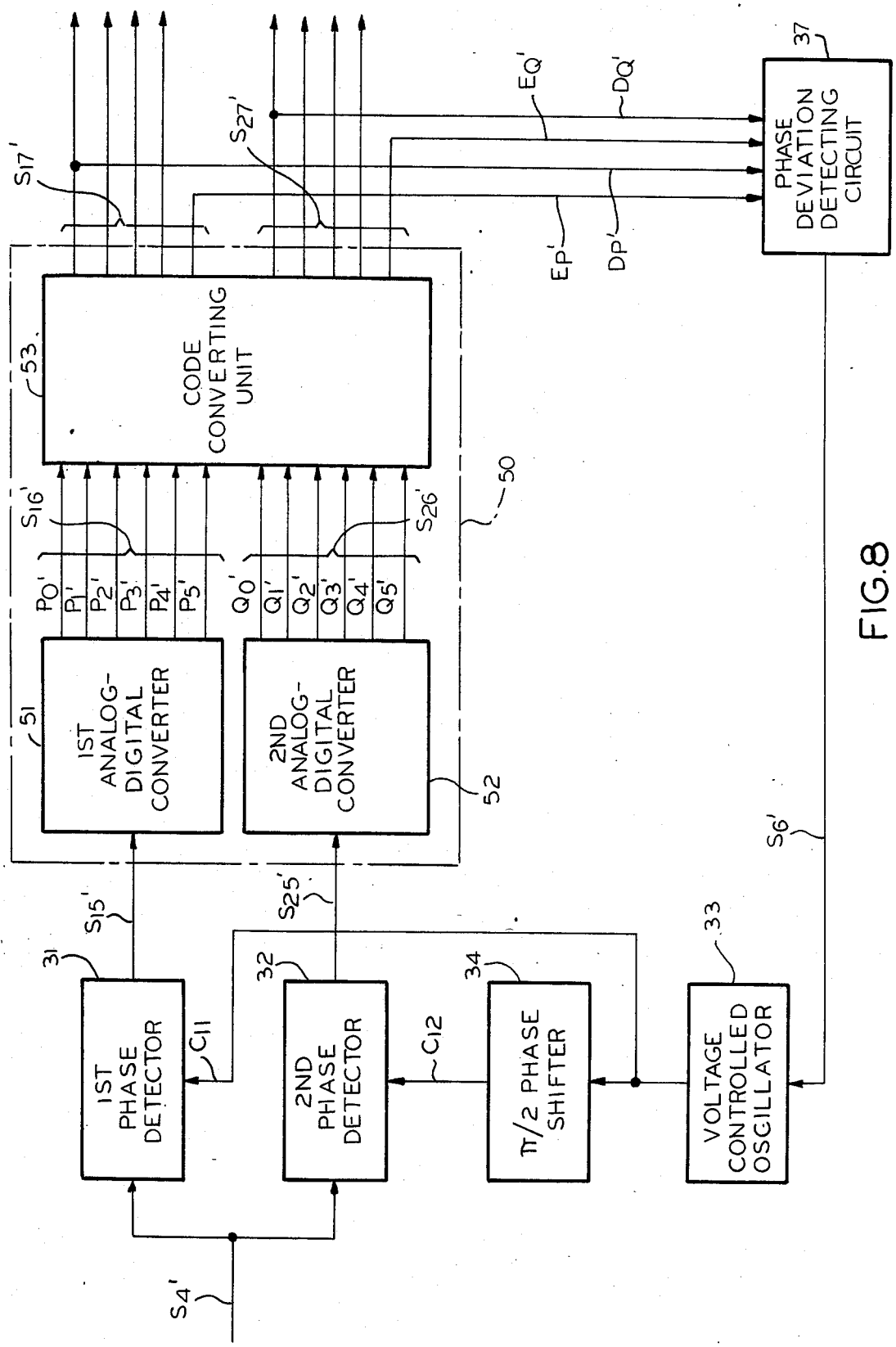
FIG. 8 is a block diagram of a multiple quadrature-phase amplitude demodulating system for use as a counterpart of the multiple quadrature-phase amplitude modulating system illustrated in FIG. 5.

Referring to FIG. 8, a multiple quadrature-phase amplitude demodulating system is for use as a counterpart of the 256-QAM system illustrated with reference to FIGS. 5 and 6. The demodulating system comprises similar parts designated by like reference numerals as in FIG. 3 except a converting circuit 50. The converting circuit 50 comprises first and second analog-digital converters 51 and 52 and a code converting unit 53 which are operable in the manner which will later be described in detail. The first and the second phase detectors 31 and 32 are supplied with a multiple quadrature-phase amplitude modulated signal as a demodulator input signal $S_4'$. When the demodulator input signal $S_4'$ is mapped on the phase plane, two hundred fifty-six signal points appear nearly at a circle on the phase plane, as mentioned before. The first and the second phase detectors 31 and 32 carry out phase detection of the demodulator input signal $S_4'$, with reference to a pair of quadrature-phase local carrier signals which consist of first and second local carrier signals $C_{11}$ and $C_{12}$ which are produced in a manner to be described. The first and the second local carrier signals $C_{11}$ and $C_{12}$ have a quadrature phase difference relative to each other, as are the cases with those described in conjunction with FIG. 1. First and second demodulated signals $S_{15}'$ and $S_{25}'$ for P- and Q-channels are produced from the first and the second phase detectors 31 and 32, respectively. Each of the first and the second demodulated signals $S_{15}'$ and $S_{25}'$ can indicate eighteen levels, differing from that illustrated in FIG. 3.

The first and the second demodulated signals $S_{15}'$ and $S_{25}'$ are supplied to first and second analog-digital converters 51 and 52 to be converted into first and second digital signals $S_{16}'$ and $S_{26}'$, respectively.

The first and second analog-digital converters 51 and 52 are similar to those illustrated in FIG. 3 except that each of the converters 51 and 52 (FIG. 8) produces each digital signal of six bits numbered from the zeroth bit (namely, most significant bit) to the fifth bit (namely, least significant bit). As described in conjunction with FIG. 3, the least significant bit represents a phase deviation while each of the remaining five bits represents a reproduction of each modified digital signal $S_{10}'$, $S_{20}'$ (FIG. 5).

In the example being illustrated, the zeroth through fifth bits of the first digital signal $S_{16}'$ is depicted at $P_0'$ through $P_5'$, respectively, while the zeroth through fifth bits of the second digital signal $S_{26}'$ are depicted at $Q_0'$ through $Q_5'$, respectively.

The code converting unit 53 converts the first and the second digital signals $S_{16}'$ and $S_{26}'$ to first and second output digital signals $S_{17}'$ and $S_{27}'$ in accordance with a prescribed rule as will later be described in detail. Each of the first and the second output digital signals $S_{17}'$ and $S_{27}'$ has five bits numbered from a first bit to a fifth bit. Like in FIG. 3, the first through the fourth bits of the first and the second output digital signals $S_{17}'$ and $S_{27}'$ are reproductions of the first and the second input digital signals $S_{10}$ and $S_{20}$ (FIG. 5), respectively. Besides, the first bits of the first and the second output digital signals $S_{17}'$ and $S_{27}'$, are produced as first and second data signals $D_P'$ and $D_Q'$ representative of one of the quadrants. The fifth bits of the first and the second output digital signals $S_{17}'$ and $S_{27}'$ are produced as first and second phase deviation signals $E_P'$ and $E_Q'$ representative of the phase deviations of the first and the second digital signals $S_{16}$ and $S_{26}$, respectively.

The code converting unit 53 can carry out the above-mentioned operation in a manner described below.

Figure 9:
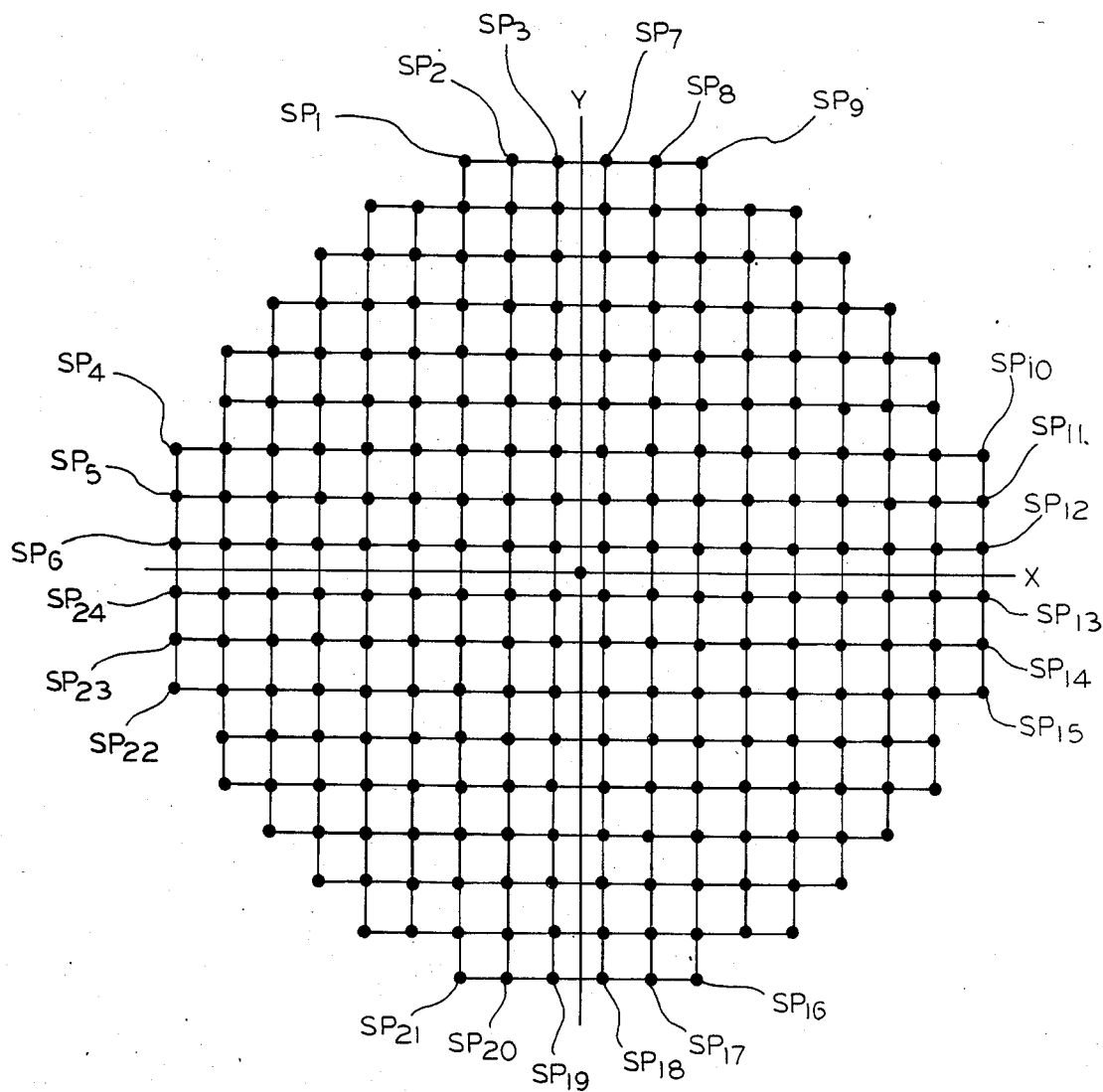
FIG. 9 is a view for use in describing a signal point arrangement of a demodulator input signal received by the multiple quadrature-phase amplitude demodulating system illustrated in FIG. 8.
Figure 10:
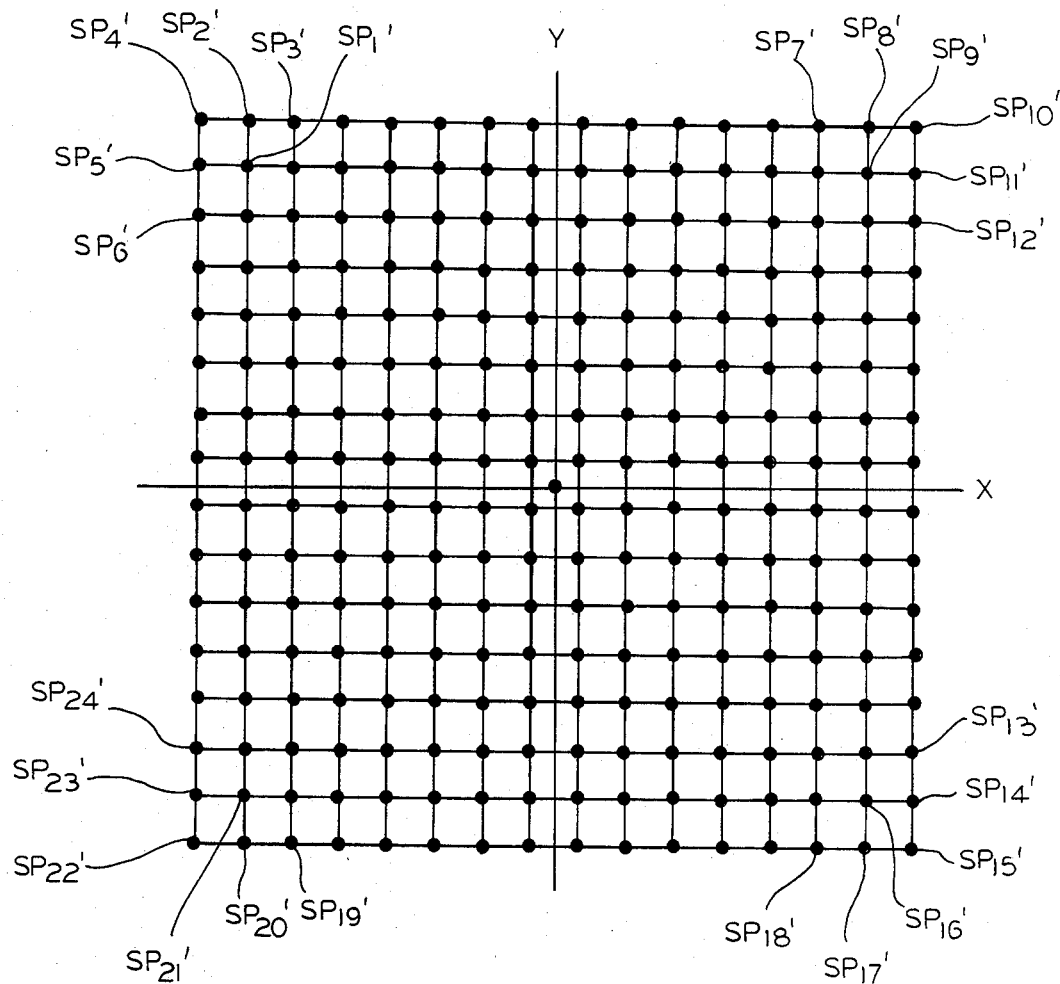
FIG. 10 is for use in describing a signal point arrangement converted by the multiple quadrature-phase amplitude demodulating system illustrated in FIG. 8.

Referring to FIGS. 9 and 10 together with FIG. 8, the signal points of the demodulator input signal $S_4'$ (FIG. 8) can be mapped on the phase plane, as illustrated in FIG. 9. More particularly, the signal points of 256 are arranged nearly at a circle on the phase plane. The above-described circular arrangement must be converted by the code converting unit 53 to a square arrangement (FIG. 10) in order to produce the reproductions of the first and the second input digital signals $S_{10}$ and $S_{20}$.

The signal points of 256 illustrated in FIG. 9 are divisible into modified or shifted signal points of twenty-four and the remaining unmodified signal points, as illustrated in conjunction with FIG. 6. The modified signal points of twenty-four will be called specific first through twenty-fourth signal points and depicted at $SP_1$ through $SP_{24}$, respectively. As shown in FIG. 9, the specific signal points $SP_1$ to $SP_{24}$ are positioned at ninth levels placed along the real and the imaginary axes X and Y.

In order to convert the circular arrangement of FIG. 9 into the square arrangement of FIG. 10, the first through twenty-fourth specific signal points $SP_1$ to $SP_{24}$ must be moved or returned back to first through twenty-fourth original signal points $SP_1'$ to $SP_{24}'$ illustrated in FIG. 10, respectively. The original signal points $SP_1'$ to $SP_{24}'$ will be referred to as predetermined signal points.

Referring to FIGS. 11 and 12 together with FIGS. 9 and 10, operation of the converting circuit 50 (FIG. 8) will be described more in detail. Codes of the first the second digital signals $S_{16}'$ and $S_{26}'$ are enumerated in FIGS. 11 and 12, respectively, in correspondence to the first through the twenty-fourth specific signal points $SP_1$ to $SP_{24}$.

In FIGS. 11 and 12, each code of the first and the second digital signals $S_{16}'$ and $S_{26}'$ has the zeroth through fifth bits, as mentioned before, and is produced by each of the first and second analog-digital converters 51 and 52. When the zeroth bit $P_0'$ or $Q_0'$ of each of the first and second digital signals $S_{16}'$ and $S_{26}'$ takes the logic "0" level, the sixth bit $P_5'$ or $Q_5'$ is indefinite. Therefore, indefiniteness of the sixth bit $P_5'$ or $Q_5'$ is represented by x. This means that each of the first and second digital signals $S_{16}'$ and $S_{26}'$ takes a level smaller than the ninth level placed along each of the real and the imaginary axes X and Y and that the phase deviation is detected by the first and second digital-analog converters 51 and 52.

To the contrary, the sixth bit $P_5'$ or $Q_5'$ takes the logic "0" level when the zeroth bit $P_0'$ or $Q_0'$ takes the logic "1" level. This implies that the logic "0" level is forcibly placed at the fifth bit $P_5'$ or $Q_5'$ when the ninth level is indicated along each of the real and the imaginary axes X and Y. In other words, no phase deviation is detected by the first and the second analog-digital converters 51 and 52 on occurrence of the logic "1" level at the zeroth bit $P_0'$ or $Q_0'$.

More specifically, the phase deviation is detected as regards the specific signal points $SP_1$ to $SP_3$; $SP_7$ to $SP_9$; and $SP_{16}$ to $SP_{21}$ with reference to the first digital signal $S_{16}'$ (FIG. 11). On the other hand, the phase deviation of the remaining specific signal points $SP_4$ to $SP_6$; $SP_{10}$ to $SP_{15}$; and $SP_{22}$ to $SP_{24}$ is detected with reference to the second digital signal $S_{26}'$ (FIG. 12).

The above-mentioned operation is readily possible in a known manner. For example, each of the first and second analog-digital converters 51 and 52 may be a combination of a usual analog-digital converter for five bits and a logic circuit for detecting the zeroth bit to decide the fifth bit.

Each of the first and the second digital signals $S_{16}'$ and $S_{26}'$ is sent to the code converting unit 53 (FIG. 8) and is subjected to code conversion illustrated in FIGS. 9 and 10 in accordance with a prescribed rule.

In FIGS. 11 and 12, the prescribed rule is for converting each code of the first and second digital signals $S_{16}'$ and $S_{26}'$ into a corresponding code of the first and second output digital signals $S_{17}'$ and $S_{27}'$ which has five bits as illustrated in FIGS. 11 and 12. The five bits of each output digital signal $S_{17}'$ and $S_{27}'$ comprise the first through the fourth bits depicted at $P_1$ to $P_4$ and $Q_1$ to $Q_4$ and the fifth bit depicted at $E_P'$ and $E_Q'$. The first through fourth bits listed in FIGS. 11 and 12 serve to specify the predetermined signal points $SP_1'$ through $SP_{24}'$, respectively, while the fifth bits $E_P'$ and $E_Q'$ serves as first and second phase deviation signals representative of the phase deviations specified by the fifth bits of the first and second digital signals $S_{16}'$ and $S_{26}'$.

It is mentioned here that each of the first and second phase deviation signals $E_P'$ and $E_Q'$ correctly takes the logic "1" level or "0" level in accordance with the phase deviation for a predetermined period determined by a sequence of clock pulses (not shown), when they are not related to the first through twenty-fourth specific signal points $SP_1$ to $SP_{24}$.

On the other hand, the first and second phase deviation signals $E_P'$ and $E_Q'$ may not be always correct when they are related to the specific signal points $SP_1$ to $SP_{24}$, as readily understood from FIGS. 11 and 12. Synchronism may wrongly be established when such phase deviation signals are used.

The illustrated code converting unit 53 monitors both of the zeroth bits $P_0'$ and $Q_0'$ of the first and second digital signals $S_{16}'$ and $S_{26}'$ to produce specific signals as the first and second deviation signals $E_P'$ and $E_Q'$. Each of the specific signals may be a sequence of pulses which has a repetition period equal to the predetermined period of the clock pulses and a duty ratio of 50%. Such specific signals are depicted at c in FIGS. 11 and 12 and equivalently take a half level between the logic "1" and "0" levels.

In FIG. 8, the first through fourth bits of each output digital signal $S_{17}'$ and $S_{27}'$ are produced as reproductions of the first and second digital input signals $E_4'$. The first and second deviation signals $E_P'$ and $E_Q'$ which include the specific signals are delivered from the code converting unit 53 to the phase deviation detecting circuit 37 together with the first and second data signals $D_P'$ and $D_Q'$. The phase deviation detecting circuit 37 is similar to that illustrated in FIG. 3 except that an average level is produced as a phase control signal $S_6'$ therefrom in response to the specific signals c. For this purpose, an integration circuit may be included in the phase deviation detecting circuit 37 in addition to the circuit illustrated in FIG. 4.

The voltage controlled oscillator 33 has a reference voltage level at which the local carrier signal $C_{11}$ has a predetermined frequency. The phase control signl $S_6'$ is selected so that the average level thereof becomes equal to the reference voltage level. Accordingly, the voltage controlled oscillator 33 delivers the local carrier signal $C_{11}$ of the predetermined frequency to the first phase detector 31 and to the second phase detector 32 through the $\pi/2$ phase shifter 34 when the specific signals c are supplied to the phase deviation detecting circuit 37.

Thus, the synchronization is established in the illustrated phase locked loop without any false phase synchronism.

While this invention has thus far been described in conjunction with a preferred embodiment, it will readily be possible for those skilled in the art to put this invention into practice in various other manners. For example, the number M ($=N^2$) may be 1024, 4096, or so. A prescribed number of the signal points may be shifted on the phase plane from the corners of the square towards the real and the imaginary axes and may not be restricted to twenty-four, if shifted signal points are placed within a circular area determined by a diagonal of the square and a square arrangement of the signal points is near to a circular arrangement.

What is claimed is:

1. A multiple quadrature-phase amplitude modulating system for modulating a pair of quadrature-phase carrier signals by a first and a second input digital signal into a multiple quadrature-phase amplitude modulated signal, each of said first and said second input digital signals being capable of representing at most N levels where N is equal to $2^i$ where, in turn, i represents an integer which is not less than four, said multiple quadrature-phase amplitude modulated signal having M signal points on a phase plane where M is equal to $N^2$, said multiple quadrature-phase amplitude modulating system comprising modulating means for amplitude modulating said quadrature-phase carrier signals into said multiple quadrature-phase amplitude modulated signal by a first and a second modulating signal, respectively, wherein the improvement comprises converting means for converting said first and said second input digital signals to said first and said second modulating signals according to a predetermined rule, respectively, said predetermined rule being for arranging said M signal points nearly at a circle on said phase plane.

2. A multiple quadrature-phase amplitude modulating system as claimed in claim 1, wherein said predetermined rule is for converting said first and said second input digital signals to said first and said second modulating signals to make said circle have a radius which is 3. A multiple guadrature-phase amplitude modulating system for modulating a pair of guadrature-phase carrier signals by a first and a second input digital signal into a multiple quadrature-phase amplitude modulated signal, each of said first and said second input digital signals being an i-bit binary digital signal, each of said first and said second input digital signals being capable of representing at most N levels where N is equal to $2^i$ where, in turn, i represents an integer which is not less than four, said multiple quadrature-phase amplitude modulated signal having M signal points on a phase plane where M is equal to $N^2$, said multiple quadrature-phase amplitude modulating system comprising modulating means for amplitude modulating said quadrature-phase carrier signals into said multiple quadrature-phase amplitude modulated signal by a first and a second modulating signal, respectively, wherein the improvement comprises converting means for converting said first and said second input digital signals to said first and said second modulating signals according to a predetermined rule, respectively, said predetermined rule being for arranging said M signal points in nearly a circle on said phase plane, wherein said predetermined rule is for converting said first and said second input digital signals to said first and said second modulating signals to make said circle have a radius which is approximately equal to $N/\sqrt{\pi}$, and wherein said predetermined rule is for giving each of said first and said second modulating signal by an (i+1)-bit signal and for making said (i+1)-bit signal represent (N+2n) levels, where n represents an integer that is not greater than $(n/\sqrt{\pi}-N/2)$.

4. A multiple quadrature-phase amplitude modulating system as claimed in claim 3, said integer i being four, said M signal points representing in each quadrant of said phase plane first through eighth real and first through eighth imaginary numbers unless said first and said second digital input signals are converted to said first and said second modulating signals, respectively, wherein said predetermined rule is for making said M signal points represent in each quadrant of said phase plane first through third real and first through ninth imaginary numbers, fourth and fifth real and first through eighth imaginary numbers, sixth real and first through seventh imaginary numbers, seventh real and first through sixth imaginary numbers, eighth real and first through fifth imaginary numbers, and ninth real and first through third imaginary numbers.

5. A multiple quadrature-phase amplitude demodulating system for demodulating a multiple quadrature-phase amplitude modulated signal into which a pair of quadrature-phase modulator carrier signals are modulated by a first and a second modulating signal, respectively, with said first and said second modulating signals converted from a first and a second input digital signal according to a predetermined rule, respectively, each of said first and said second input digital signals being capable of representing at most N levels where N is equal to $2^i$ where, in turn, i represents an integer which is not less than four, said multiple quadrature-phase amplitude modulated signal having M signal points on a phase plane where M is equal to $N^2$, said predetermined rule being for arranging said M signal points nearly at a circle on said phase plane, said multiple quadrature-phase amplitude demodulating system comprising demodulating means responsive to a pair of quadrature-phase local carrier signals for amplitude demodulating said multiple quadrature-phase amplitude modulated signal into a first and a second demodulated signal, wherein the improvement comprises:

converting means for converting said first and said second demodulated signals to a first and a second output digital signal according to a prescribed rule, respectively, said prescribed rule corresponding to said predetermined rule to give said first and said second output digital signals as reproductions of said first and said second input digital signals, respectively.

6. A multiple quadrature-phase amplitude demodulating system as claim in claim 5, wherein said prescribed rule is for arranging said M signal points at a square on said phase plane, said square having four sides each of which corresponds to said N levels.

7. A multiple quadrature-phase amplitude demodulating system for demodulating a multiple quadrature-phase amplitude modulated signal into which a pair of quadrature-phase modulator carrier signals are modulated by a first and a second modulating signal, respectively, with said first and said second modulating signals being converted from a first and a second input digital signal according to a predetermined rule, respectively, each of said first and said second input digital signals being capable of representing at most N levels where N is equal to $2^i$ where, in turn, i represents an integer which is not less than four, said multiple quadrature-phase amplitude modulated signal having M signal points on a phase plane where M is equal to $N^2$, said predetermined rule being for arranging said M signal points in nearly a circle on said phase plane, said multiple quadrature-phase amplitude demodulating system comprising demodulating means responsive to a pair of quadrature-phase local carrier signals for amplitude demodulating said multiple quadrature-phase amplitude modulated signal into a first and a second demodulated signal, wherein the improvement comprises:

converting means for converting said first and said second demodulated signals to a first and a second output digital signal according to a prescribed rule, respectively, said prescribed rule corresponding to said predetermined rule to give said first and said second output digital signals as reproductions of said first and said second input digital signals, respectively, wherein said prescribed rule is for arranging said M signal points in a square on said phase plane, said square having four sides each of which corresponds to said N levels, and wherein said prescribed rule is for giving each of said first and said second digital output signals by an i-bit signal where i is equal to $\log_2 N$.

8. A multiple quadrature-phase amplitude demodulating system for demodulating a multiple quadrature-phase amplitude modulated signal into which a pair of quadrature-phase modulator carrier signals are modulated by a first and a second modulating signal, respectively, with said first and said second modulating signals being converted from a first and a second input digital signal according to a predetermined rule, respectively, each of said first and said second input digital signals being capable of representing at most N levels where N is equal to $2^i$ where, in turn, i represents an integer which is not less than four, said multiple quadrature-phase amplitude modulated signal having M signal points on a phase plane where M is equal to $N^2$, said predetermined rule being for arranging said M signal points in nearly a circle on said phase plane, said predetermined rule further being for converting a square arrangement formed by a square of said M signal points into a circular arrangement of said circle on said phase plane, the M signal points of said circular arrangement being divisible into specific signal points placed outside of said square and the remaining signal points places inside of said square, said multiple quadrature-phase amplitude demodulating system comprising demodulating means responsive to a pair of quadrature-phase local carrier signals for amplitude demodulating said multiple quadrature-phase amplitude modulated signal into a first and a second demodulated signal, wherein the improvement comprises:

converting means for converting said first and said second demodulated signals to a first and a second output digital signal according to a prescribed rule, respectively, said prescribed rule corresponding to said predetermined rule to give said first and said second output digital signals as reproductions of said first and said second input digital signals, respectively; wherein said converting means comprises:

detecting means responsive to said first and said second demodulated signals for detecting said specific signal points to produce specific signals representative of said specific signal points;

means responsive to said first and said second demodulated signals for producing said first and said second output digital signals in accordance with said prescribed rule; and means for feeding said specific signals back to said demodulating means.

* * * * *